Patented Aug. 2, 1932

1,869,862

UNITED STATES PATENT OFFICE

LUDWIG ORTHNER, OF LEVERKUSEN-ON-THE-RHINE, GERMANY, ASSIGNOR TO I. G. FARBENINDUSTRIE AKTIENGESELLSCHAFT, OF FRANKFORT-ON-THE-MAIN, GERMANY

VULCANIZATION ACCELERATOR

No Drawing. Application filed June 23, 1931, Serial No. 546,416, and in Germany June 28, 1930.

The present invention relates to new vulcanization accelerators, to a process of vulcanizing rubber in the presence of said accelerators and to the vulcanizates obtainable by said process.

In accordance with the present invention new vulcanization accelerators are obtainable by reacting upon a salt of a compound having in its free form the formula

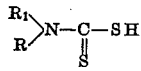

wherein R means an aliphatic, alicyclic or aromatic hydrocarbon radical, $R_1$ means an aliphatic or alicyclic hydrocarbon radical, or R and $R_1$ jointly stand for an alkylene group with an asymmetrical dihalogenacetone, preferably, asymmetrical dichloroacetone. The reaction is advantageously performed by causing a dithiocarbamic acid salt, favorably a sodium salt, to react with an about equivalent, that is half a molecular quantity of an asymmetric dihalogenacetone, preferably dichloroacetone. The process is carried out in an indifferent solvent, such as acetone; the reaction already starts at room temperature, and can be accelerated by heating the reaction mixture, preferably by heating under a reflex condenser. From the reaction mixture the new products can be isolated by distilling off the solvent, in some cases, for example, when working with acetone as a solvent, the condensation product may be precipitated by the addition of water. When using water as solvent, the condensation product separates during the reaction.

As compounds of the above formula there may be mentioned by way of example, dimethyldithiocarbamic acid, diethyldithiocarbamic acid, methyl-isobutyldithiocarbamic acid, methyl-cyclohexyldithiocarbamic acid, dicyclohexyldithiocarbamic acid, ethyl-phenyldithiocarbamic acid; further suitable dithiocarbamic acids of the above general formula are obtainable by condensing carbondisulfide with the following secondary amines:—dibenzylamine, piperidine, piperazine, morpholine, perhydrocarbazole.

The products obtainable according to the process above described most probably correspond to the formula

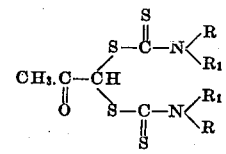

wherein R means an aliphatic, alicyclic or aromatic hydrocarbon radical, $R_1$ means an aliphatic or alicyclic hydrocarbon radical, or R and $R_1$ attached to the same nitrogen atom jointly stand for an alkylene group. They are generally white crystallized substances, insoluble in water, soluble in the usual organic solvents, and are valuable vulcanization accelerators, possessing a good critical temperature, in view of which fact the new accelerators are superior to the known dialkylamine salts of dialkyldithiocarbamic acids (the piperidine salt of cyclopentamethylene-dithiocarbamic acid, for example), which are very active accelerators, but possess an unfavorable critical temperature.

For vulcanization purposes the new vulcanization accelerators are incorporated within the rubber (which term is intended to include artificial rubber-like masses, derived, for example, from butadiene, isoprene, dimethylbutadiene or another homologue or analogue of butadiene, as well as natural rubber) in any desired manner, for example, by rolling or kneading. Obviously, a vulcanizing agent, such as sulfur, agents being able to split off sulfur, selenium etc. is likewise added, and, if desired, other ingredients known to favorably influence rubber-vulcanization processes or the properties of the vulcanizates may be admixed to the vulcanization mixture. The latter is then vulcanized in the usual manner by heating it to a temperature sufficient to perform vulcanization, for example, to a temperature between about 100–170° C.

The following examples will illustrate the invention, without, however, restricting it thereto:—

Example 1

366 parts by weight of the sodium salt of penta-methylene-dithiocarbamic acid are dissolved in 1100 parts by weight of acetone and mixed with a solution of 127 parts by weight of as-dichloroacetone in 330 parts by weight of acetone. The reaction, starting with the separation of sodium chloride is completed by boiling under a reflux condenser for a short time. After having filtered off the sodium chloride, the condensation product is isolated either by distilling off the solvent or by precipitation with water. The product is in its dry state a white crystalline substance.

Example 2

In an experimental mixture of the composition:—

100  parts by weight of light crepe
    5    parts by weight of zinc oxide
    2.5  parts by weight of sulfur
    1    part by weight of stearic acid the following values were obtained, using the products of the reaction of as-dichloroacetone with the sodium salts of dimethyldithiocarbamic acid (A) and of cyclopentamethylene-dithiocarbamic acid (B), compared with those resulting from the use of the piperidine salt of cyclopentamethylene-dithiocarbamic acid (C):—

Tearing strength in kg. per sq. cm.

| Heating | Percentage elongations | | |
|---|---|---|---|
| | A 0.5% | B 0.5% | C 0.3% |
| ½ atm. 30 minutes pressure above atmospheric | 3/1033 | no vulcanization | 189/895 |
| 1 atm. 50 minutes pressure above atmospheric | 140/920 | 192/850 | 222/902 |

Example 3

In a mixture of the composition:—

100  parts by weight of light crepe
    5    parts by weight of zinc oxide
    2.5  parts by weight of sulfur
    1    part by weight of stearic acid the following values were obtained using the product of the reaction of as-dichloroacetone with the sodium salt of dicyclohexyl-dithiocarbamic acid:—

Tearing strength in kg. per sq. cm.

| Heating | Percentage elongations |
|---|---|
| ½ atm. 30 minutes pressure above atmospheric 0.5 part of accelerator | no vulcanization |
| 1 atm. 50 minutes pressure above atmospheric 0.5 part of accelerator | 180/895 |

Similar results are obtained by the use of rubber-like masses, such as can be obtained, for example, by the polymerization of butadiene-(1.3) or homologues and analogues thereof.

I claim:

1. As new products compounds of the probable general formula

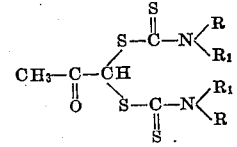

wherein the R's mean aliphatic, alicyclic or aromatic hydrocarbon radicals, the $R_1$'s mean aliphatic or alicyclic hydrocarbon radicals, or R and $R_1$ being attached to the same nitrogen atom jointly stand for an alkylene group, being generally white crystallized substances, insoluble in water, soluble in the usual organic solvents, and being valuable vulcanization accelerators.

2. As new products compounds of the probable general formula

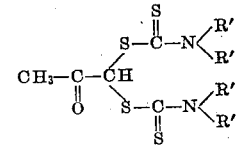

wherein the R"'s mean alkyl groups or the R"'s being attached to one nitrogen atom jointly stand for alkylene groups, being generally white crystallized substances, insoluble in water, soluble in the usual organic solvents and being valuable vulcanization accelerators.

3. As a new product the compound of the probable formula

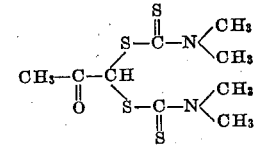

being a white crystallized substance, insoluble in water, soluble in the usual organic solvents, and being a valuable vulcanization accelerator.

4. As a new product the compound of the probable formula

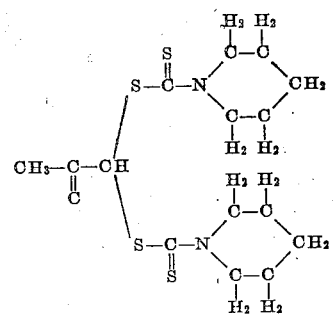

being a white crystallized substance, insoluble in water, soluble in the usual organic solvents, and being a valuable vulcanization accelerator.

5. The process which comprises incorporating within rubber a vulcanizing agent and a compound of the probable general formula

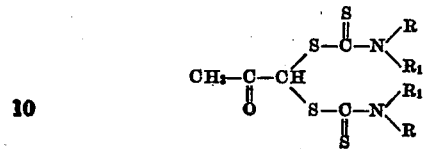

wherein the R's mean aliphatic, alicyclic or aromatic hydrocarbon radicals, the $R_1$'s mean aliphatic or alicyclic hydrocarbon radicals, or R and $R_1$ being attached to the same nitrogen atom stand for alkylene groups, and vulcanizing the mixture.

6. The process which comprises incorporating within rubber a vulcanizing agent and a compound of the probable general formula

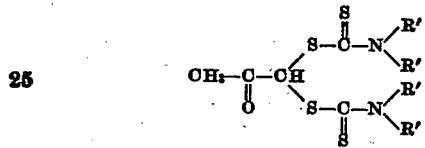

wherein the R"'s mean alkyl groups or the R"'s being attached to the same nitrogen atom jointly stand for alkylene groups, and vulcanizing the mixture.

7. The process which comprises incorporating within rubber a vulcanizing agent and a compound of the probable formula

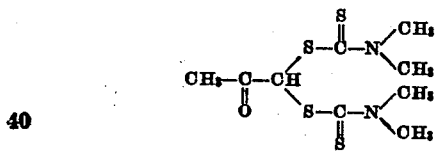

and vulcanizing the mixture.

8. The process which comprises incorporating within rubber a vulcanizing agent and a compound of the probable formula

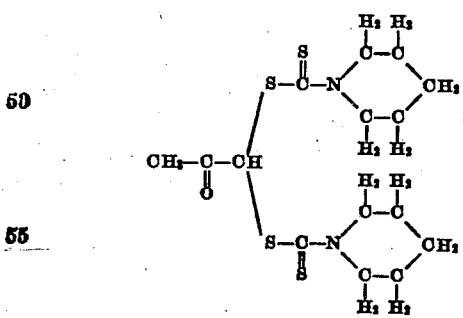

and vulcanizing the mixture.

9. The vulcanizates obtainable in accordance with claim 5.

10. The vulcanizates obtainable in accordance with claim 6.

11. The vulcanizates obtainable in accordance with claim 7.

12. The vulcanizates obtainable in accordance with claim 8.

In testimony whereof I have hereunto set my hand.

LUDWIG ORTHNER.